US012786212B2

(12) United States Patent
Reiter et al.

(10) Patent No.: US 12,786,212 B2
(45) Date of Patent: Nov. 3, 2026

(54) SYSTEM AND METHOD FOR REAL-TIME DATA THREAT DETECTION ON UNSCANNED SENSITIVE UNSTRUCTURED DATA

(71) Applicant: Sentra LTD, Tel Aviv (IL)

(72) Inventors: Ron Reiter, Tel Aviv (IL); Alex Molotsky, Tel Aviv (IL); Daniel Suissa, Tel Aviv (IL)

(73) Assignee: Sentra LTD, Tel Aviv (IL)

( * ) Notice: Subject to any disclaimer, the term of this patent is extended or adjusted under 35 U.S.C. 154(b) by 51 days.

(21) Appl. No.: 18/945,117

(22) Filed: Nov. 12, 2024

(65) Prior Publication Data

US 2026/0135863 A1 May 14, 2026

(51) Int. Cl.
*G06F 21/00* (2013.01)
*H04L 9/40* (2022.01)

(52) U.S. Cl.
CPC ...... *H04L 63/1416* (2013.01); *H04L 63/1441* (2013.01)

(58) Field of Classification Search
CPC ........................ H04L 63/1416; H04L 63/1441
See application file for complete search history.

(56) References Cited

U.S. PATENT DOCUMENTS

| | | | | |
|---|---|---|---|---|
| 2019/0361937 A1* | 11/2019 | Rogynskyy | .......... | G06Q 10/107 |
| 2020/0125746 A1* | 4/2020 | Joshi | .................. | G06F 21/6245 |
| 2023/0114821 A1* | 4/2023 | Thomas | ................ | G06F 21/552 726/23 |
| 2025/0298888 A1* | 9/2025 | Itzhak | .................. | G06F 21/554 |
| 2025/0371154 A1* | 12/2025 | Badragan | ............. | G06F 21/565 |

* cited by examiner

*Primary Examiner* — Kendall Dolly
(74) *Attorney, Agent, or Firm* — M&B IP Analysts, LLC

(57) ABSTRACT

A method and system of the device may include receiving an event on a potential cyber incident, where the event includes at least a file name of a file and is triggered as a file is accessed. In addition, the device may include determining an object key based on the file name designated in the event. The device may include enriching the received event to include the determined object group associated with the file. Moreover, the device may include determining based on the object group if the file contains sensitive data. Also, the device may include causing execution of a mitigation action if the file contains sensitive data.

21 Claims, 6 Drawing Sheets

SYSTEM AND METHOD FOR REAL-TIME DATA THREAT DETECTION ON UNSCANNED SENSITIVE UNSTRUCTURED DATA

TECHNICAL FIELD

The present disclosure relates generally to cyber security technologies and, more specifically, to techniques for detecting sensitive data.

BACKGROUND

These days, online businesses and organizations are vulnerable to malicious attacks. Recently, cyber-attacks have been committed using a wide arsenal of attack techniques and tools targeting both the information maintained by online businesses, their IT infrastructure, and the actual service availability. Hackers and attackers are constantly trying to improve their attack strategies to cause irrecoverable damage, overcome currently deployed protection mechanisms, and so on.

In today's digital age, organizations generate and store vast amounts of data that may include structured and unstructured data. Examples of unstructured data include emails, documents, images, and more. This data often contains sensitive information that, if compromised, can result in significant financial losses, reputational damage, and legal liabilities. The traditional security measures employed to protect such data, including periodic scanning and manual classification, are no longer adequate due to the real-time nature of data generation and the sophisticated methods employed by cyber attackers to exploit vulnerabilities. Moreover, once data is created or modified, it may not be scanned again for threats or changes in sensitivity, which creates a significant gap in data security. With the increasing use of AI modules like GPT, unstructured data files are being generated at high volumes and frequencies. Consequently, current solutions for scanning and identifying sensitive data in such files are inadequate.

The existing solutions fail to address the challenge of real-time threat detection in unscanned, sensitive unstructured data effectively. These solutions either focus on structured data, leaving unstructured data vulnerable, or they operate in a batch mode that does not support real-time detection. Moreover, they often require prior knowledge of the data's sensitivity status, which is not always feasible in dynamic and fast-paced organizational environments. As a result, sensitive information remains at risk of unauthorized access and exploitation, posing a continuous threat to data security.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation cause(s) the system to perform the actions. One or more computer programs can be configured to perform particular operations or actions by virtue of including instructions that, when executed by a data processing apparatus, cause the apparatus to perform the actions.

In one general aspect, the method may include receiving an event on a potential cyber incident, where the event includes at least a file name of a file and is triggered as a file is accessed. Method may also include determining an object key based on the file name designated in the event. Method may furthermore include enriching the received event to include the determined object group associated with the file. Method may in addition include determining based on the object group if the file contains sensitive data. Method may moreover include causing execution of a mitigation action if the file contains sensitive data. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: receive an event on a potential cyber incident, where the event includes at least a file name of a file and is triggered as a file is accessed; determine an object key based on the file name designated in the event; enrich the received event to include the determined object group associated with the file; determine based on the object group if the file contains sensitive data; and cause execution of a mitigation action if the file contains sensitive data. Other embodiments of this aspect include corresponding computer systems, apparatus, and computer programs recorded on one or more computer storage devices, each configured to perform the actions of the methods.

In one general aspect, the system may include one or more processors configured. System may also include receiving an event on a potential cyber incident, where the event includes at least a file name of a file and is triggered as a file is accessed. System may furthermore include determining an object key based on the file name designated in the event. System may in addition enrich the received event to include the determined object group associated with the file. System may moreover include determining based on the object group if the file contains sensitive data. System may also include cause execution of a mitigation action if the file contains sensitive data. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
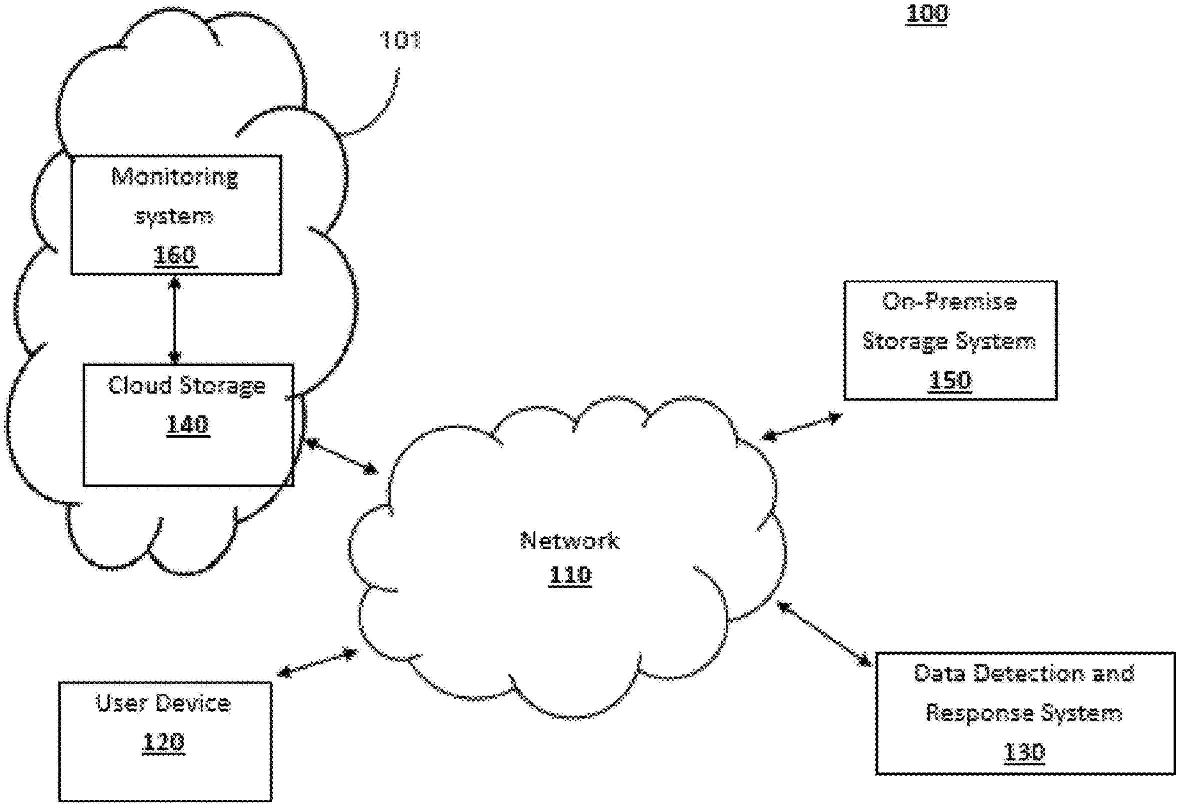
FIG. 1A shows an example network diagram utilized to describe the various disclosed embodiments.

The various disclosed embodiments include a method and system for detecting sensitive unstructured data in real time. The generated representation supports files or objects regardless of whether or not they were previously scanned for sensitivity, given that a preliminary mapping and scanning process has already occurred. The disclosed representation allows for real-time threat detection of access or leakage of sensitive data. This ability is especially useful for machine-based systems which create files in high volumes and frequencies and need to respond to access sensitive data fast.

Generally, sensitive data refers to information that should be protected from unauthorized access to safeguard the privacy or security of an individual or organization. This type of data, if compromised, can result in harm, fraud, or identity theft. Sensitive data typically includes personally identifiable information (PII), health information, financial information, confidential business information, government data, authentication information, and the like.

The ability to detect sensitive data in real time may offer significant advantages. Real-time detection, in contrast to a deferred detection system, allows for the immediate protection of a file system by reducing the window of vulnerability for sensitive data. Real-time detection may also allow for continuous compliance with data protection regulations such as GDPR and HIPAA. A real-time detection system may allow for faster incident response to policy violations as compared to a deferred detection system.

The disclosed embodiments use a structure called "object group," which groups files or objects on file systems stored in the cloud in all different types of forms. An object group contains files (in an unstructured format) classified as containing at least one file classified as sensitive data or insensitive data. The accessed object is mapped to only one object group. That is, there is a one-to-one mapping between an object and an object group. The grouping, in an embodiment, is performed prior to the activation of the data detection capabilities. To this end, any unclassified file can be mapped to an object group without scanning the file-sensitive data. That is, it allows classifying files on the fly while not utilizing compute resources for scanning the file. This capability may be utilized for real-time threat detection, where an unclassified accessed file is mapped to at least one object group to determine whether or not it contains sensitive information. Access to an object or a file determined to contain sensitive information may be mitigated. A decision on mitigation can be made based on a security policy.

In a file system, a mitigation action or function may reduce or eliminate identified risks or threats to the system's security or performance. Mitigation may include taking actions to stop or limit potential threats to a system's security before they can compromise the system. Various security threats may result from a file system that handles sensitive data. Such threats may include a risk of unauthorized access to sensitive files, a risk of data breaches and theft of sensitive data, a risk of mishandling of sensitive data by authorized users, a risk of corruption of sensitive data, a risk of accidental deletion of sensitive data, and a risk of compromised data resulting from the introduction of malicious software. Therefore, in a file system that handles sensitive data, it may be helpful to employ a mitigation function that reduces such risks.

In the cyber world, mitigation functions or actions typically occur after detection or investigation of a cyber threat. For example, an authorized access to sensitive data should be detected and/or investigated prior to execution of a mitigation action. A mitigation action may include generating and sending alerts, blocking access, initiating forensic, and so on.

The disclosed embodiments allow for detecting sensitive data on the fly without having to scan or analyze the contents of the entire file. This allows for significant time-saving, compute resource-saving, and the like. This ability also provides better security as a threat detection system can be deployed and operated without having the entire file systems or storage scanned. In a typical enterprise, the size of the data is petabytes, and it would require days to scan the entire corpse. As noted above, with the increasing use of AI modules like GPT, or other types of LLMs, unstructured data files are being generated at high volumes and frequencies. Thus, the disclosed embodiments are adequate for near real-time scanning and identifying sensitive data in such files.

It should be understood that due to the number of files and the frequency of changes in files, the operations described herein cannot be performed using the human mind or by performing the operation using paper and pencil. For example, a number of files accessed, added, and/or modified per day in a typical enterprise is over 200 million files. Moreover, a human operator applies subjective criteria to determine if data is sensitive or not, leading to results that are not consistent between different human operators and often not consistent between the same human performing the same task repeatedly, and in particular at the speeds required to provide an operable solution. Further, the number of possible permutations for analyzed files, security processes, and policies far exceeds any practical use of the human mind.

FIG. 1A shows an example network diagram 100 utilized to describe the various disclosed embodiments. In the example network diagram 100, a user device 120, a data detection and response (DDR) system 130, a cloud storage 140, an on-premise storage system 150, and a cloud monitoring and logging system 160, communicate via a network 110. Network 110 may be, but is not limited to, a wireless, cellular, or wired network, a local area network (LAN), a wide area network (WAN), a metro area network (MAN), the Internet, the world wide web (WWW), similar networks, and any combination thereof.

The user device (UD) 120 may be but is not limited to, a personal computer, a laptop, a tablet computer, a smartphone, a wearable computing device, or any other device capable of receiving and displaying notifications. The user device 120 is capable of accessing data stored on the cloud storage 150 or the on-premise storage system 160. The data accessed by the user device 120 may be sensitive data. The user device 120 may be operated on by a malicious actor or a legitimate actor. Both malicious actors and legitimate actors should not be able to access sensitive data through the user device 120.

The cloud storage 140 may be an object storage system such as Amazon® S3, Google® Cloud Storage, or Azure@ Blob Storage. It may also be a mountable block storage, such as Amazon EBS, Google® Persistent Disk, or Azure® Disk Storage. The cloud storage 140 may also be a serverless cloud file system such as AWS Elastic File System or Azure® Files. The type of cloud storage may vary in an embodiment based on different needs and use cases of the file system. A cloud storage 140 stores data across multiple servers, as opposed to a local device. The presence of redundant data across multiple servers within cloud storage 140 may help to ensure consistent availability of data and the prevention of data loss. It should be noted that cloud storage may contain unstructured data. Cloud storage 140 is deployed in a cloud computing environment 101 that may include a public cloud, a private cloud, and a hybrid cloud. Cloud storage 140 may be hosted in two or more different cloud computing environments.

Cloud storage 140 may implement cloud storage-based file systems, such as AWS S3, Google® Cloud Platform (GCP), Google® Cloud Storage (GCS), and Azure® Blob Storage, open-source self-hosted file systems, such as MinIO, serverless cloud file systems such as AWS Elastic File System or Azure® Files, storage platforms such as NetApp, and the like.

On-premise storage system 150 is a data storage system that is physically located within an organization's own facilities or data centers, unlike cloud storage 140. On-premise storage system 150 is characterized by organizational ownership and control over the storage environment, which may include hardware selection, configuration, and a security apparatus. It should be noted that an on-premise storage system 150 may contain unstructured data. System 150 may implement any mountable file system, including local disks in servers, cloud storage such as mountable block storage, network file storage via protocols, such as Network File System (NFS), Server Message Block (SMB), or any other network file storage. In an embodiment, storage system 150 may include databases, such as relational databases or non-relational databases.

The cloud monitoring and logging system 160 provides visibility, control, and security for cloud resources in cloud environment 101 by monitoring activity, logging events, and facilitating compliance. Examples for system 160 may include an AWS CloudTrail, Google® Cloud Operations Suite, Azure® Monitor, and the like. It should be noted that although other events are not shown, reporting may be operated in the arrangement shown in FIG. 1A.

According to the disclosed embodiments, DDR system 130 is configured to classify data stored in the cloud storage 140 and/or on-premise and for real-time threat detection on scanned or unscanned data. The operation of DDR system 130 is on data belonging to a protected entity (e.g., a customer). In an embodiment, real-time threat detection is enabled by a data classification of pre-existing data performed by DDR system 130. The process of data classification, in an embodiment, is described herein and involves the creation of object groups from objects within a file system, the tokenization of object groups, and the creation of a prefix tree using the resulting tokens. DDR system 130 analyzes the prefix tree for potentially sensitive data associated with specific object groups or combinations of object groups. DDR system 130 is then enabled in an embodiment to parse previously unscanned and unstructured data in real-time to check for sensitivity. The real-time ability to detect sensitive data allows for DDR system 130 to efficiently maintain data security within a file system, such as a file system in which files may be accessed by user device 120.

Figure 1B:
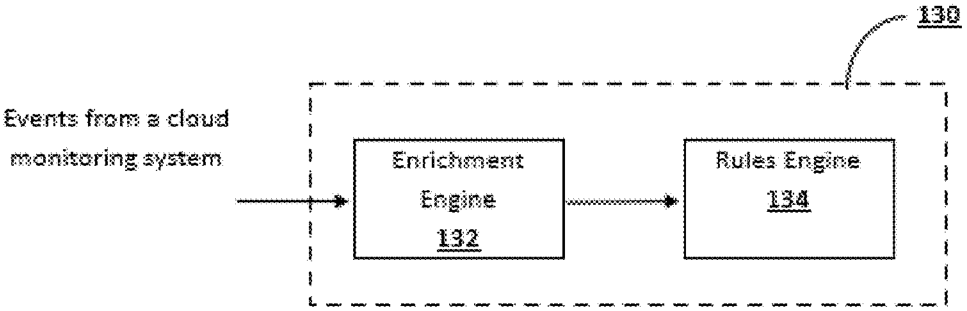
FIG. 1B shows an example diagram of logical engines in a DDR system, enabling the detection of potential threats in real-time.

FIG. 1B shows an example diagram of logical engines in DDR system 130, enabling the detection of potential threats in real-time. In an embodiment, following a preliminary mapping and scanning process assessing the sensitivity of the files within a file system, DDR system 130 may access information about the files transmitted through a network 110 by first receiving the information at an enrichment engine 132.

Data enrichment is the process by which existing or incoming data is augmented with relevant information from an external source or through an analytical process. For the purpose of threat detection, according to the disclosed embodiments, data enrichment allows for data that enters a system to be flagged as sensitive. In an embodiment, received events are processed by an enrichment engine 132 and thereby flagged as sensitive and may retain this marker of sensitivity for the purpose of further processing by other components of a threat detection system, which may include a rules engine. Enrichment engine 132 may allow for the standardization of incoming data into discrete categories, resulting in more efficient processing by other components of a threat detection system. The data processed by an enrichment engine 132 may be sent from among a plurality of sources, including an internal database, third-party data provider, or the internet.

To facilitate efficient operation, in an embodiment, enrichment engine 132 may generate an object key in response to an incoming event associated with an object or file. An event is a discrete occurrence that takes place within a file system and results in a data log entry. An object key is a unique identifier assigned to a specific data object or file. An object key may be in the form of a file path that utilizes forward slashes to denote hierarchy. An object key for an object or file may be used by enrichment engine 132 efficiently due to its core property of being unique as compared to all other object keys. The enrichment of an object key by a data enrichment engine may thus be efficiently traced to a single object or file.

According to the disclosed embodiments, enrichment engine 132 may be enabled in real time to read files that are present in data logs that monitor interactions between cloud storage 140 and/or on-premise storage system 150 and the rest of the environment. Files present in data logs that are read by enrichment engine 132 may be transmitted in the form of events from a monitoring system 160 through a network 110. Enrichment engine 132 may then map these files to a corresponding object group represented by part of a prefix tree. Based on DDR 130's preliminary determination of the sensitivity of the object group, enrichment engine 132 may then flag the mapped files as being sensitive. The real-time sensitivity analysis capability of enrichment engine 132 allows for efficient monitoring of data transmitted from any cloud storage 140 or on-premise storage system 150 through a network 110. It should be noted that enrichment engine 132 may operate on many types of logs, such as, but not limited to, AWS CloudTrail events or database events.

In an embodiment, following the determination of the sensitivity of a previously unscanned file, enrichment engine 132 may transmit data associated with an event that is flagged for sensitivity to a rules engine 134. Rules engine 134 may then determine whether the transaction of the file has incurred a policy violation according to rules governing the handling of sensitive files. If a policy violation is determined to have occurred, rules engine 134 may then issue a mitigation action, such as an alert. Rules engine 134, thereby, interacts with enrichment engine 132 to comprise the threat detection functionality of DDR system 130. DDR system 130 is thus enabled to detect potential threats in real-time for a plurality of applications.

As a non-limiting example, a user device 120 attempting to initiate the transaction of a sensitive file may result in DDR system 130 alerting a system administrator or other user of the file system of a policy violation. In an embodiment, other mitigation actions, such as blocking file access or preventing certain operations on a file, can be initiated or triggered by DDR system 130 upon the valuation of a policy.

It should be emphasized that DDR system 130 is adapted for the real-time threat detection of sensitive, unclassified, and unstructured data. Unstructured data, unlike structured data, does not have a predefined format or organization. Unstructured data does not follow a specific model and may, therefore, be more difficult to search and analyze within a file system than structured data. Unstructured data may be more text-heavy and may include text documents, emails, images, and audio files. Unstructured data may be stored in a data lake, which is a type of data storage repository designed for storing raw data. In contrast, structured data may be stored in a data warehouse, which is a type of data storage repository optimized for fast querying and analysis. The difficulty of searching for and analyzing unstructured data gives rise to the need for an efficient method of determining the sensitivity of unscanned unstructured data.

The particular configurations depicted in FIGS. 1A and 1B are examples only. For example, each of the systems is represented separately in FIGS. 1A and 1B, in some embodiments, one or more of the systems may be implemented using the same hardware, software, virtual machine, or the like. Furthermore, each of the systems is represented as a single entity in FIGS. 1A and 1B, in some embodiments, each such system may include one or more entities. Although not depicted in FIG. 1A, DDR system 130 may be connected to external sources to receive security events, mitigation systems, and data enrichment data sources.

Furthermore, DDR system 130 can be realized as a physical machine, a virtual machine, or a combination thereof. An example diagram of a physical machine implementation is shown below. A virtual machine can be implemented as any virtual instance, a software container, a microservice, and the like. DDR system 130 can be deployed in a cloud computing environment or on-premise. DDR system 130 can be deployed as a component of cloud storage 140 or part of a cloud orchestrator (not shown). The enrichment engine 132 and rules engine 134 may be realized in hardware, software, firmware, or any combination thereof.

Figure 2:
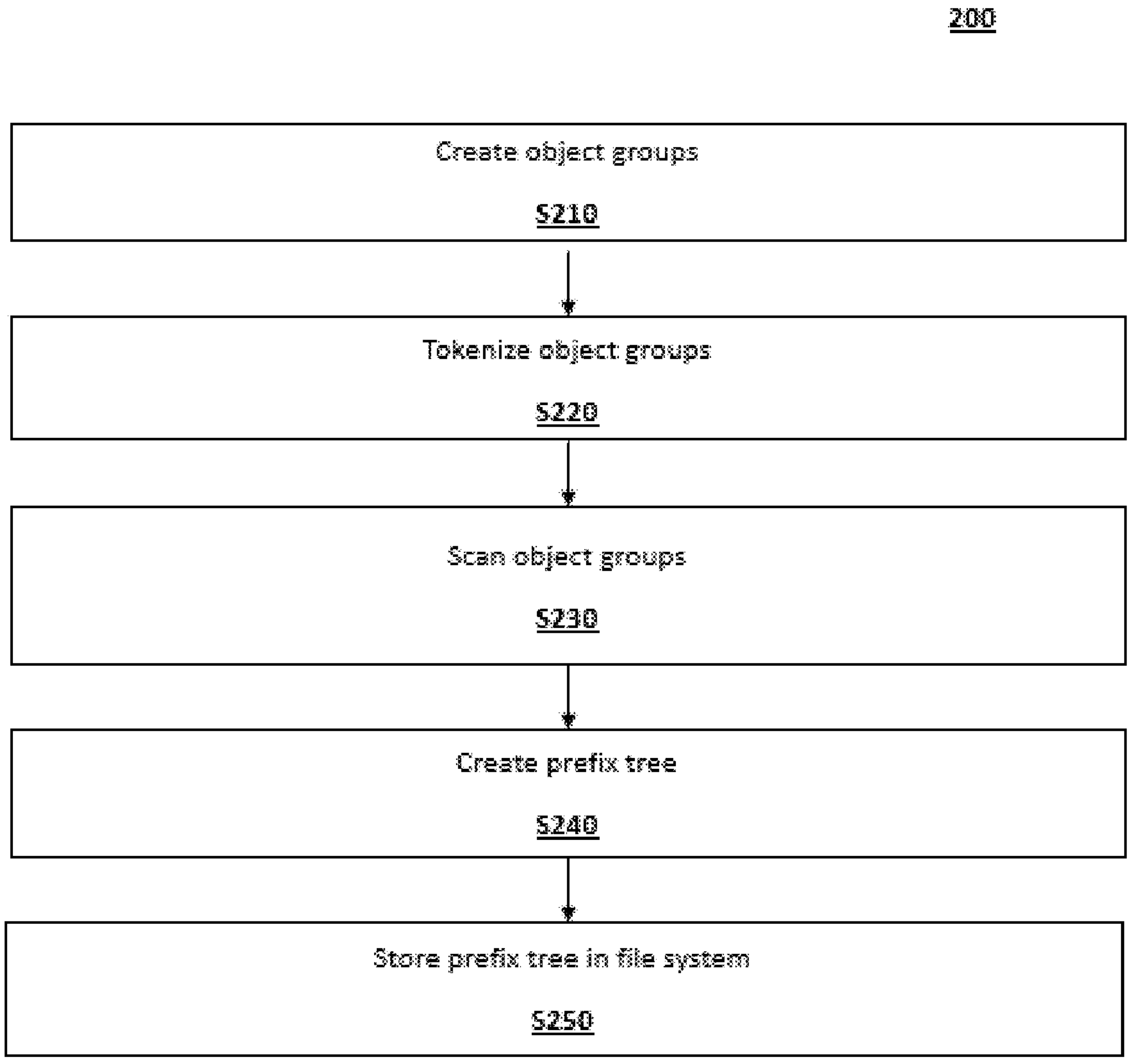
FIG. 2 shows an example flowchart of a method for data classification according to an embodiment.

FIG. 2 shows an example flowchart 200 of a method for data classification according to an embodiment. The method can be performed by DDR system 130.

At S210, object groups are created from the files within a file system. An object group is a group of objects that follow a pattern that can map into a series of one or more objects. Multiple files may be mapped into only a single object group. An object group is a single data entity or file that may be a fundamental unit of storage in a file storage system. In an embodiment, an object may be uniquely identified by its file name. However, multiple objects may be associated with the same object group based on similarities in their file names. This ensures that all group objects provide sensitive data classification of all objects in a customer environment. In an embodiment, the similarity between two or more objects may be defined and limited by the number of characters shared by the file names of the objects, starting with the leftmost character of the file name. In such an embodiment, the characters to the right of such shared characters may uniquely identify the objects as to each other. For example, the following files:

"s3://sample-bucket/sample-folder/part__0000.gz"
"s3://sample-bucket/sample-folder/part__0001.gz"
"s3://sample-bucket/sample-folder/part__0002.gz"

Are mapped into the object group:

s3://sample-bucket/sample-folder/part_[DIGITS].gz

It should be noted that such uniquely identifying characters may include combinations of characters that may be recognized as special patterns. A non-limiting example of such a special pattern may be a sequence of numerical digits. A special pattern may be denoted by a special pattern token enclosed in brackets during the process of object group tokenization S220. For example, a sequence of numerical digits may be denoted by the special pattern token [DIGITS]. Object groups are created by first comparing the file names of multiple objects and determining the similarities that may exist between the objects. Any remaining characters within the file names that are not similar may then be denoted by one or more special patterns. The object group is then denoted as the sequential combination of any similar characters shared by the file names of the objects and any special patterns identified between the objects.

In one embodiment, the object groups may be derived from cloud storage-based file systems, such as AWS S3, GCP GCS, and Azure® Blob Storage. In another embodiment, the object groups may be derived from open-source self-hosted file systems such as MinIO. In yet another embodiment, the object groups may be derived from any mountable file system, including local disks in servers, cloud storage such as mountable block storage, network file storage via protocols, such as NFS, SMB, or any other network file storage.

In yet another embodiment, the object groups may be derived from serverless cloud file systems such as AWS Elastic File System or Azure® Files or platforms such as NetApp, which are also supported by the present disclosure. However, the present disclosure is not limited to the file systems mentioned herein.

At S220, the object groups created at S210 are tokenized. In an embodiment, this includes mapping the object groups to a list of tokens and separators. In an embodiment, a token may be defined as a sequence of one or more alphanumeric characters, and a separator may be defined as a sequence of one or more special characters. For example, the object group "s3://sample-bucket/sample-folder/part_[DIGITS].gz" may be represented by the following list of tokens and separators following object group tokenization:

["s3", "://"], ["sample", "-"], ["bucket", "/"], ["sample", "-"], ["folder", "/"], ["part", "_"], ["[DIGITS]", "."], ["gz", ""]

It should be noted that the order of the tokens corresponding to an object group should be preserved during the construction of a prefix tree, as denoted in S240. It should also be noted that the special patterns indicated with brackets may be referenced as regular expressions. For example, the special pattern "[DIGITS]" may be interpreted as the regular expression "\d+" for the purpose of mapping an object to an object group.

It should also be noted that in an embodiment, the process of creating object groups S210 and mapping object groups to a list of tokens and separators S220 may be performed ahead of a real-time detection phase performed by DDR system 130.

At S230, the object groups are scanned or analyzed to statistically determine what type of sensitive data appears under each object group. For each object group, a statistically significant sample of objects within the object group is scanned to determine whether the objects include sensitive information. It is then determined what type of sensitive information is included within the sample of objects. The results from the scan are then extrapolated to apply to the object group itself. Through this procedure, each object group within a file system is labeled with an indication of what kind of sensitive information the object group includes. For example, the scanned data can be classified as sensitive or not sensitive. The labeling of sensitive data may include, for example, data PII, health information, financial information, confidential business information, government data, authentication information, and the like. The labeling may further include the sensitivity level of data, e.g., high, medium, or low.

It should be noted that once it is determined what type of sensitive data appears under each object group, an object that was not scanned either before or after the scan at S230 can be mapped to an object group without scanning. Such an object contains sensitive data with a high probability. This ability is derived from the statistical analysis that files that follow the same pattern contain the same amount of data under various conditions. As a non-limiting example, files that have the same extension and only vary by attributes that are numerical or range-based, such as numbers, hexadecimal values, or timestamps, can be assumed to contain the same amount of data. If an object group corresponding to such a collection of files is shown to contain sensitive information through a scan, an unscanned object that maps to such an object group can reasonably be assumed to have a high probability of containing sensitive information.

As per the disclosed embodiments, sensitive data classification does not necessitate scanning the entire file system. Instead, a statistically significant sample of files or objects in the file system can be used. For example, only 30% of the files need to be scanned, and the remaining files can be classified based on their mapping to the respective object group. As such, the classification of files can be performed in less time and with the consumption of less compute resources.

At S240, a prefix tree is created. In an embodiment, a prefix tree may be defined as a relationship between tokens embodying all the objects within a file system. Such a relationship may be characterized by a hierarchical structure wherein tokens that exist earlier in an object group appear earlier in the prefix tree, and tokens that exist later in an object group appear later in the prefix tree. In an embodiment, each token within a prefix tree may be represented by a node that may connectedly follow a singular earlier node and from which multiple later nodes may connectedly follow. Within a prefix tree, a path may be defined as a sequence of connected nodes starting with the earliest node of the prefix tree and proceeding unidirectionally to later nodes of the prefix tree, concluding with a node for which no later connected node exists.

Figure 3:
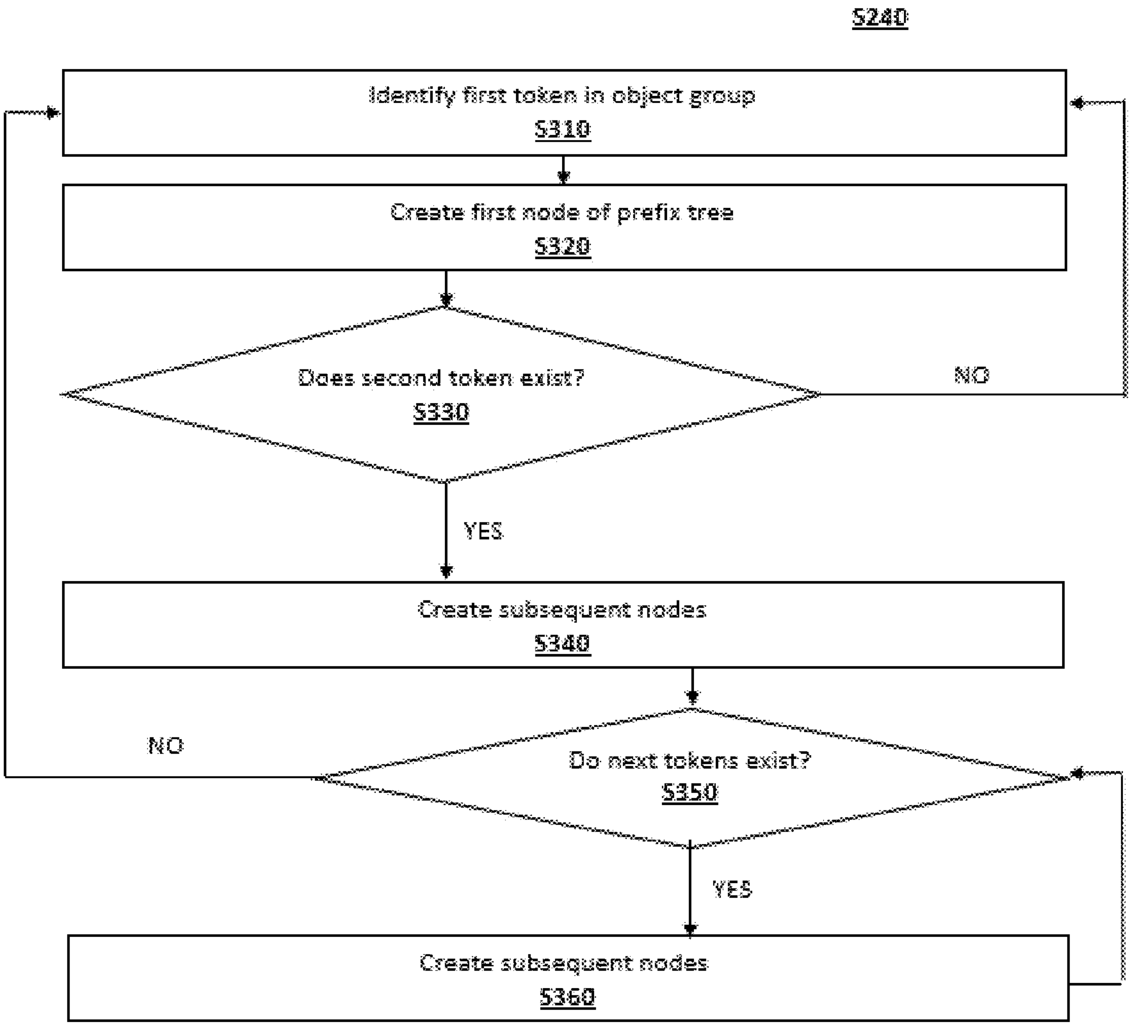
FIG. 3 shows an example flowchart illustrating the operation of S in FIG. 2 to create a prefix tree according to the disclosed embodiments.

The procedure for the creation of a prefix tree is further described in FIG. 3. It should be noted that within a file system, following object group tokenization and prefix tree creation, all objects will be fully described by a path within the prefix tree.

At S250, the prefix tree is stored in the file system and may be utilized for the detection of real-time threats. It should be noted that in an example embodiment, a prefix tree may be stored in the form of a JSON-serialized tree. A JSON-serialized tree is a representation of a hierarchical data structure in the form of a tree and organized according to JSON (JavaScript Object Notation). It should be noted that there may be other variations for storing a prefix tree in a file system that does not use JSON-serialized trees, and such variations are compatible with the present disclosure.

It should be further noted that in various embodiments, a prefix tree can be mapped for a file system, such as an S3 bucket, an Azure® Blob Container, or a name of an EFS file system. Other variations in which a prefix tree is mapped for a different file system are compatible with the present disclosure. It should be noted that in an embodiment, a prefix tree may be stored in a global database, which is available for a real-time threat detection service to load.

FIG. 3 shows an example flowchart 300 illustrating the operation of S240 in FIG. 2 to create a prefix tree according to the disclosed embodiments.

At S310, the first token in an object group is identified. It should be noted that the first token and every subsequent token that is identified during the procedure is treated independently from its separator.

At S320, the token identified at S310 is established as the first node of the prefix tree. In an embodiment, the first node of a prefix tree may be the earliest node of such a tree.

At S330, all possible tokens that may follow the first node established at S320 are identified. This is performed by parsing all object groups within the file system. A second token may follow the first node if there exists an object group whose first token is the first token represented by the first node of the prefix tree and whose second token follows the first token. If no tokens exist, execution returns.

At S340, all tokens identified at S330 are established as subsequent nodes connected to and following the node established at S320. For example, if there are two tokens, "sample" and "new", that have been identified as following the first node of a prefix tree, "bucket", two new nodes will result. These two nodes, which may be denoted as "sample" and "new", respectively, will connectedly follow the first node, "bucket", while maintaining independence from each other. Any path of the resulting prefix tree will include one of the nodes, "sample" or "new", to the exclusion of the other.

At S350, all possible tokens that may follow the latest established nodes are identified. If no such tokens exist, execution returns to S310; otherwise, execution proceeds to S360.

At S360, all tokens identified at S350 are established as subsequent nodes connected to and following their respective nodes. Following this step, the procedure returns to S350.

In an embodiment, the generated tree can be utilized for real-time threat detection to occur on unscanned sensitive data. To this end, an event that a file or object was accessed may be received. Then, the accessed file is mapped to the corresponding object group based on the tokenized trees, which were constructed ahead of time. For example, the following S3 object:

s3://sample-bucket/sample-folder/part_0003.gz

The object "/part_0003.gz" was not scanned before, so there is no information if it contains sensitive data or not. However, the object can be mapped, for example, maps to the object group:

s3://sample-bucket/sample-folder/part_[DIGITS].gz

Thus, the DDR system and method disclosed herein can infer that this object group may contain sensitive data, which will enable the policy engine to trigger a violation based on the aforementioned object group, even though the file or object was not labeled as containing sensitive data in the original event.

Figure 4:
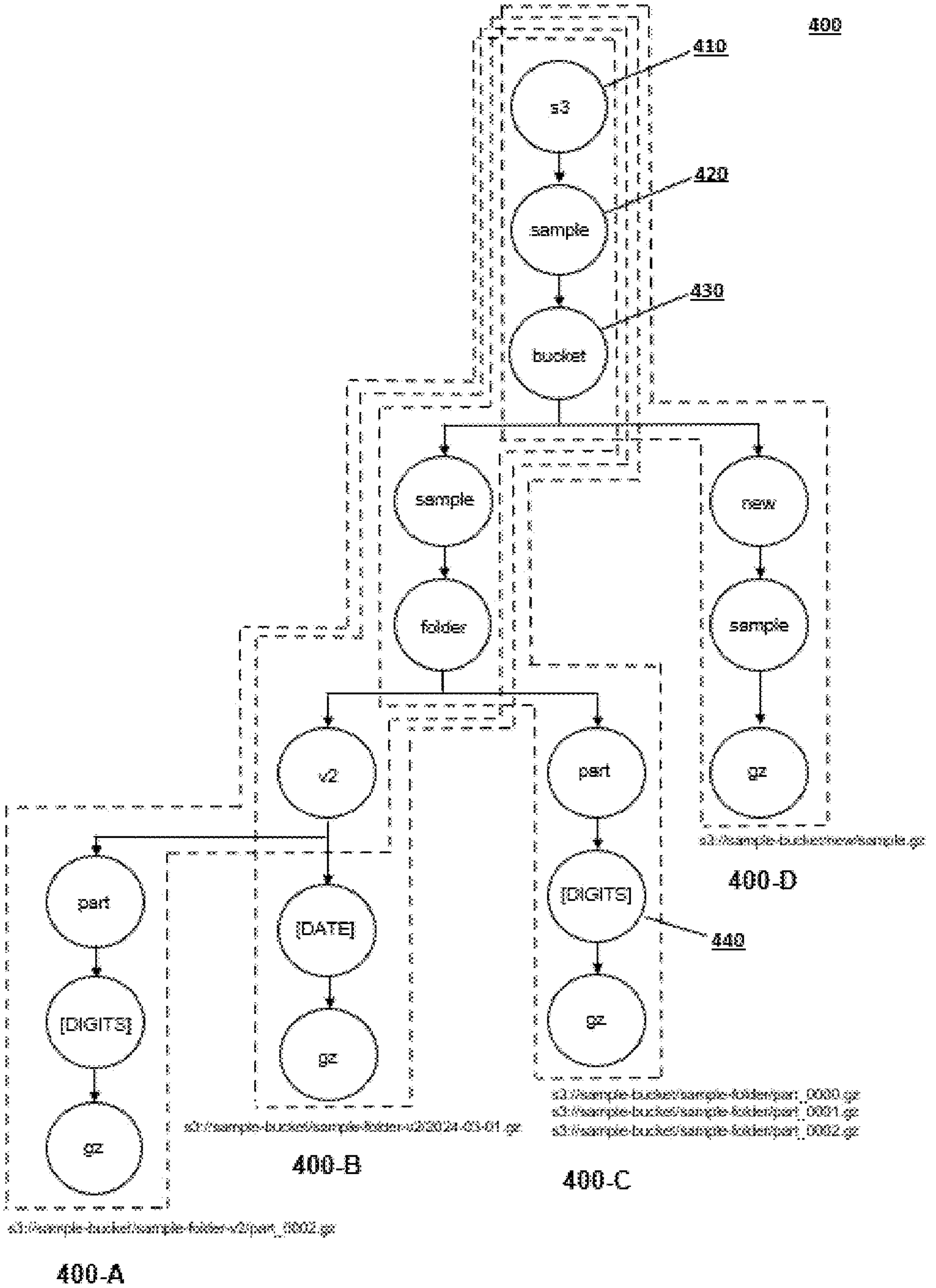
FIG. 4 is an example diagram demonstrating the possible structure of a prefix tree corresponding to an S3 Bucket file system, according to an embodiment.

FIG. 4 is an example diagram demonstrating the possible structure of a prefix tree corresponding to an S3 Bucket file system, according to an embodiment. The individual tokens constituting the nodes of the prefix tree, as well as the paths labeled 400-A, 400-B, 400-C, and 400-D, are derived from the following six objects:

"s3://sample-bucket/sample-folder-v2/part_0002.gz",
"s3://sample-bucket/sample-folder-v2/2024-03-01.gz",
"s3://sample-bucket/sample-folder/part_0000.gz",
"s3://sample-bucket/sample-folder/part_0001.gz",
"s3://sample-bucket/sample-folder/part_0002.gz", and
"s3://sample-bucket/new/sample.gz".

It should be noted that within FIG. 4, four paths are described by the prefix tree, which are labeled as 400-A, 400-B, 4000-C, and 400-D. The number of tokens included within each path is dependent on the number of tokens present in the object group that each path embodies.

It should be further noted that the four paths labeled 400-A, 400-B, 4000-C, and 400-D contain the same first three nodes. The first node 410 is denoted as "s3", the second node 420 is denoted as "sample", and the third node 430 is denoted as "bucket". In an embodiment, the paths in a prefix tree may share one or more nodes as in the example embodiment demonstrated in FIG. 4.

It should also be noted that paths within a prefix tree may contain equivalent tokens after their divergence from each other while remaining distinct. For example, the four paths 400-A, 400-B, 4000-C, and 400-D conclude with the same token, "gz". The existence of equivalent tokens does not allow for a convergence of paths according to the present disclosure.

As shown, at path 400-A, an object, "s3://sample-bucket/sample-folder-v2/part_0002.gz", is represented by an object group and corresponding path composed of nine tokens. Each token in the path is presented in the exact order that it appears in the object itself.

At path 400-B, an object, "s3://sample-bucket/sample-folder-v2/2024-03-01.gz", is represented by an object group and corresponding path composed of eight tokens. It should be noted that the number of tokens included in this path is different from the number of tokens included in path 400-A because the object that is represented involves a different number of tokens. In an embodiment, the number of tokens in any path is similarly dependent on the number of tokens that are derived from the objects present in the file system.

At path 400-C, three objects, "s3://sample-bucket/sample-folder/part_0000.gz", "s3://sample-bucket/sample-folder/part_0001.gz", and "s3://sample-bucket/sample-folder/part_0002.gz", are represented by an object group and corresponding path composed of eight tokens. It should be noted that in an embodiment, as demonstrated by path 400-C, multiple objects may be represented by a single object group. The ability for multiple objects to be represented by an object group may be derived from the presence of one or more special patterns. Within path 400-C, the special pattern that allows for the representation of multiple objects is denoted by the penultimate token 440, "[DIGITS]".

At path 400-D, an object, "s3://sample-bucket/new/sample.gz", is represented by an object group and corresponding path composed of six tokens.

It should be noted that although the example prefix tree demonstrated in FIG. 4 corresponds to an S3 Bucket file system, other variations of creating a prefix tree according to FIG. 3 that is applied to other types of file systems will achieve similar results and are compatible with the present disclosure.

Figure 5:
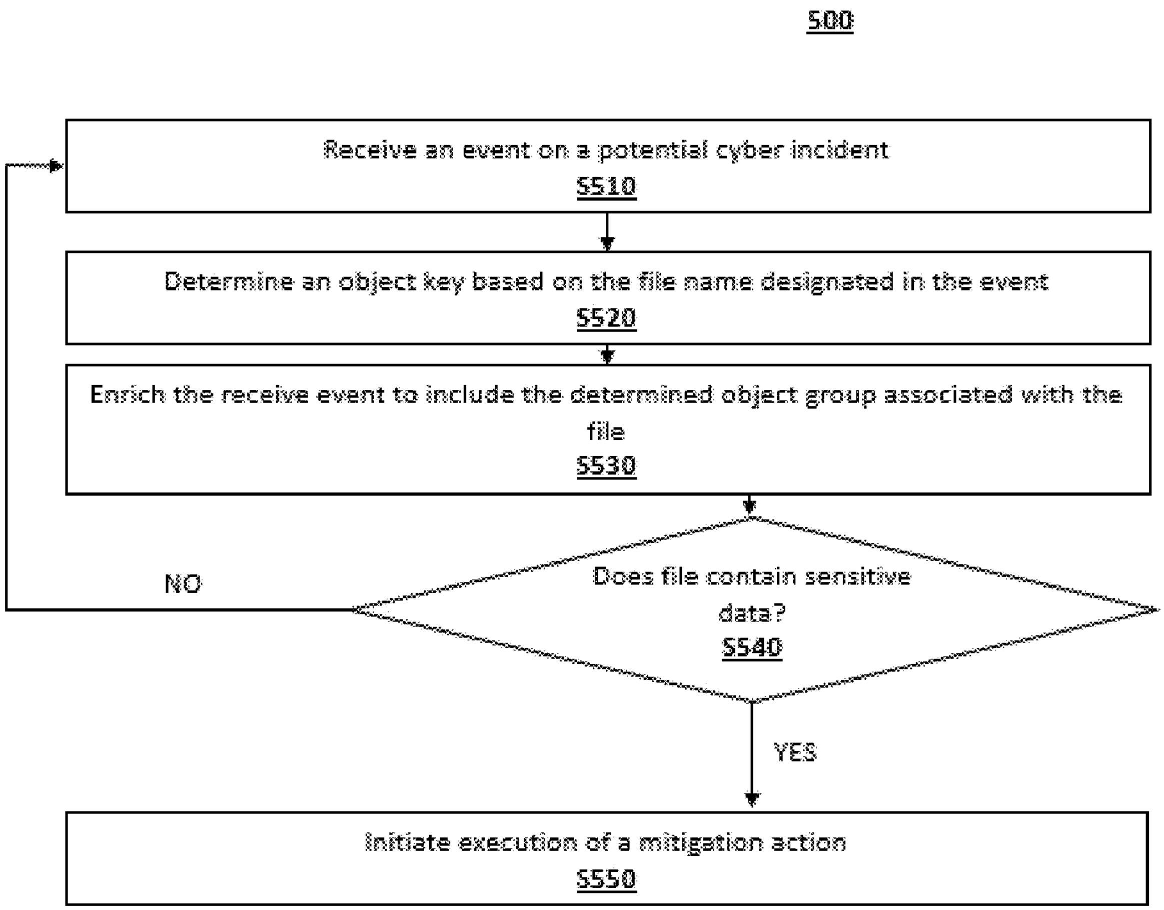
FIG. 5 shows an example flowchart for real-time data threat detection on unclassified sensitive data according to an embodiment.

FIG. 5 shows an example flowchart 500 for real-time data threat detection on unclassified sensitive data according to an embodiment. The method can be performed by DDR system 130.

At S510, an event corresponding to a potential cyber incident is received from a cloud monitoring and logging system. In an embodiment, the event may be triggered when a file or object is accessed by a user device. The record of the event sent to the threat detection system includes at least a file name of the accessed file or object. It should be noted that the event may take the form of a data log that monitors interactions within the environment. The log may embody one of a plurality of forms, including, but not limited to, AWS CloudTrail events or database events.

At S520, a target object key is determined based on the file name designated for the event. It should be noted that the target object key should be constructed so as to uniquely identify the file it is associated with. As noted above, the target object key may be denoted as a file path using forward slashes to indicate hierarchy.

At S530, the target object key is mapped to an object group within a prefix tree and the event is then enriched to include a sensitivity data label associated with the object group. It should be noted that sensitivity data labels may include information about a plurality of characteristics related to sensitivity, such as the degree of sensitivity and the category of sensitive data to which an object group may belong. The mapping process is first initiated by the tokenization of the target object key. As with the tokenization step denoted at S220, the target object key is mapped to a list of tokens and separators, where a token may be defined as a sequence of alphanumeric characters, and a separator may be defined as a sequence of one or more special characters.

Following the tokenization of the target object key, a prefix tree for the file system is searched, and a path within the prefix tree is identified that corresponds to the tokenized target object key. A tokenized target object key may be viewed as corresponding to a path if its sequence of tokens is aligned with the sequence of tokens represented by the path. A token within a tokenized target object key may be viewed as aligned with a token within a path if it is identical to that token or, in the case of special patterns, it possesses characteristics that are embodied by that token, as discussed further below.

It should be noted that each path of a prefix tree represents an object group, and a target object key that aligns with a path may be viewed as belonging to its representative object group. Once a path that corresponds to the target object key is identified, the sensitivity data associated with the path is retrieved. The event associated with the target object key is then enriched with the sensitivity data corresponding to its respective path. The mapping of a target object key to an object group and the corresponding enrichment of an event with sensitivity data, as denoted by S530, may be performed by an enrichment engine within a threat detection system.

It should be further noted that the tokenization of the target object key may establish one or more tokens that map to a token within a path representing a special pattern. In an embodiment, a threat detection system may be enabled to recognize the characters within a token of a target object key as a special pattern and map the token to a corresponding special pattern token within a path.

At S540, a determination is made as to whether the enriched event is sensitive or not sensitive based on an analysis of the enriched sensitivity data label. If the event is determined to be sensitive, execution proceeds to S550; if the event is determined not to be sensitive, execution returns to S510 when another event is processed. It should be noted that in an embodiment, S540 may be performed by a rules engine within a threat detection system.

At S550, a mitigation action is initiated in response to a determination that an enriched event is sensitive. In an embodiment, the mitigation action may take the form of an alert and may be initiated by a rules engine within a threat detection system. In other embodiments, the mitigation action may include blocking access to sensitive data or blocking certain functionalities with respect to the sensitive data. For example, if the sensitive data is a file, a mitigation action can be implemented to prevent downloading, printing, saving, and/or forwarding the file.

Figure 6:
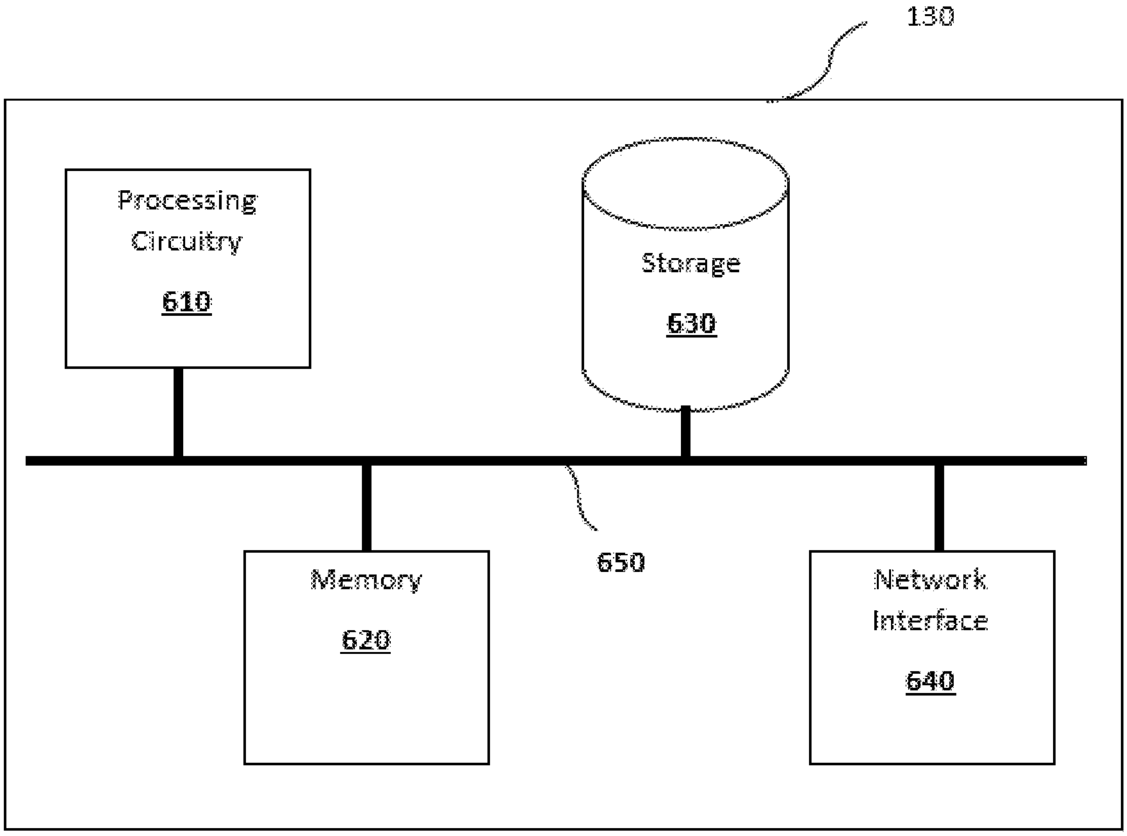
FIG. 6 is an example schematic diagram of a DDR system according to an embodiment.

FIG. 6 is an example schematic diagram of a DDR system 130 according to an embodiment. DDR system 130 includes a processing circuitry 610 coupled to a memory 620, a storage 630, and a network interface 640. In an embodiment, the components of DDR system 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows DDR system 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for real-time data threat detection on unclassified sensitive data, comprising:

receiving an event of a plurality of events on a potential cyber incident, wherein the event includes at least a file name of a file of a plurality of files and is triggered as a file is accessed;

determining an object key based on the file name designated in the event;

grouping files of the plurality of files into a plurality of group objects, wherein each group object of the plurality of group objects defines a specific pattern;

tokenizing each group object of the plurality of group objects, wherein a token allows the mapping of files to a group object;

analyzing the files in each group object of the plurality of group objects to statistically determine a type of sensitive data currently in each object group;

generating a tree labeling each group object with a respective sensitive label corresponding to the determined type;

enriching the received event to include a determined group object associated with the file;

determining based on the group object associated with the file if the file contains sensitive data; and causing execution of a mitigation action if the file contains sensitive data.

2. The method of claim 1, wherein enriching the received event further comprises:

attaching at least a sensitivity data label to the received event.

3. The method of claim 2, wherein the sensitivity data label includes information about a plurality of characteristics related to the sensitivity of the data, the characteristics include a degree of sensitivity and the category of sensitive data to which an object group may belong.

4. The method of claim 1, wherein enriching the received event further comprises:

mapping the object key to an object group within a tree.

5. The method of claim 4, wherein a prefix tree provides a relationship between tokens embodying all the objects within a file system.

6. The method of claim 1, wherein the specific pattern is a sequential combination of any similar characters shared by the file names of the objects and any special patterns identified between the objects.

7. The method of claim 1, wherein the plurality of group objects provides a classification of all of the objects in a customer environment.

8. The method of claim 5, wherein analyzing a subset of files in each of a plurality of group objects further comprises:

determining the type of sensitive data of object group determined to include sensitive data; and associating an object to a classified object group without scanning the object, wherein the classified object group.

9. The method of claim 1, further comprising:

scanning only a portion of objects in a file system to allow mapping to object groups.

10. The method of claim 1, wherein the object groups can be derived from any one of: cloud storage-based file and serverless cloud file systems.

11. A non-transitory computer-readable medium storing a set of instructions for real-time data threat detection on unclassified sensitive data, the set of instructions comprising:

one or more instructions that, when executed by one or more processors of a device, cause the device to:

receive an event of a plurality of events on a potential cyber incident, wherein the event includes at least a file name of a file of a plurality of files and is triggered as a file is accessed;

determine an object key based on the file name designated in the event;

group files of the plurality of files into a plurality of group objects, wherein each group object of the plurality of group objects defines a specific pattern;

tokenize each group object of the plurality of group objects, wherein a token allows the mapping of files to a group object;

analyze the files in each group object of the plurality of group objects to statistically determine a type of sensitive data currently in each object group;

generate a tree labeling each group object with a respective sensitive label corresponding to the determined type;

enrich the received event to include a determined group object associated with the file;

determine based on the group object associated with the file if the file contains sensitive data; and cause execution of a mitigation action if the file contains sensitive data.

12. A system for real-time data threat detection on unclassified sensitive data comprising:

one or more processors configured to:

receive an event of a plurality of events on a potential cyber incident, wherein the event includes at least a file name of a file of a plurality of files and is triggered as a file is accessed;

determine an object key based on the file name designated in the event;

group files of the plurality of files into a plurality of group objects, wherein each group object of the plurality of group objects defines a specific pattern;

tokenize each group object of the plurality of group objects, wherein a token allows the mapping of files to a group object;

analyze the files in each group object of the plurality of group objects to statistically determine a type of sensitive data currently in each object group;

generate a tree labeling each group object with a respective sensitive label corresponding to the determined type;

enrich the received event to include a determined group object associated with the file;

determine based on the group object associated with the file if the file contains sensitive data; and cause execution of a mitigation action if the file contains sensitive data.

13. The system of claim 12, wherein the one or more processors, when enriching the received event, are configured to:

attach at least a sensitivity data label to the received event.

14. The system of claim 13, wherein the sensitivity data label includes information about a plurality of characteristics related to the sensitivity of the data, the characteristics include a degree of sensitivity and the category of sensitive data to which an object group may belong.

15. The system of claim 12, wherein the one or more processors, when enriching the received event, are configured to:

map the object key to an object group within a tree.

16. The system of claim 15, wherein a prefix tree provides a relationship between tokens embodying all the objects within a file system.

17. The system of claim 16, wherein analyzing a subset of files in each of a plurality of group objects further comprises:

determining the type of sensitive data of object group determined to include sensitive data; and associating an object to a classified object group without scanning the object, wherein the classified object group.

18. The system of claim 12, wherein the specific pattern is a sequential combination of any similar characters shared by the file names of the objects and any special patterns identified between the objects.

19. The system of claim 12, wherein the plurality of group objects provides a classification of the objects in a customer environment.

20. The system of claim 12, wherein the one or more processors are further configured to:

scan only a portion of objects in a file system to allow mapping to object groups.

21. The system of claim 12, wherein the object groups can be derived from any one of: a cloud storage-based file and serverless cloud file systems.

* * * * *